United States Patent
Lillibridge (10) Patent No.: US 8,904,128 B2
(45) Date of Patent: Dec. 2, 2014

(54) PROCESSING A REQUEST TO RESTORE DEDUPLICATED DATA

(75) Inventor: Mark David Lillibridge, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 242 days.

(21) Appl. No.: 13/155,566

(22) Filed: Jun. 8, 2011

(65) Prior Publication Data

US 2012/0317359 A1 Dec. 13, 2012

(51) Int. Cl.
- *G06F 13/00* (2006.01)
- *G06F 11/14* (2006.01)
- *G06F 12/08* (2006.01)
- *G06F 12/00* (2006.01)

(52) U.S. Cl.
CPC ............ *G06F 12/00* (2013.01); *G06F 11/1469* (2013.01); *G06F 12/08* (2013.01); *G06F 11/1453* (2013.01); *G06F 12/0866* (2013.01)
USPC .......................................... 711/162; 707/692

(58) Field of Classification Search
CPC combination set(s) only.
See application file for complete search history.

(56) References Cited

U.S. PATENT DOCUMENTS

| | | | |
|---|---|---|---|
| 4,075,686 A * | 2/1978 | Calle et al. ..................... | 711/138 |
| 5,257,367 A * | 10/1993 | Goodlander et al. .................. | 1/1 |
| 5,369,778 A | 11/1994 | San Soucie | |
| 5,638,509 A | 6/1997 | Dunphy | |
| 5,838,943 A * | 11/1998 | Ramagopal et al. .......... | 712/218 |
| 6,396,838 B1 | 5/2002 | Palnati | |
| 6,795,963 B1 | 9/2004 | Andersen | |
| 6,938,005 B2 | 8/2005 | Iverson | |
| 7,082,548 B2 | 7/2006 | Nakano | |
| 7,269,689 B2 | 9/2007 | Eshghi | |
| 7,472,242 B1 | 12/2008 | Deshmukh et al. | |
| 7,567,188 B1 * | 7/2009 | Anglin et al. .................... | 341/63 |
| 7,584,338 B1 | 9/2009 | Bricker et al. | |
| 7,631,155 B1 | 12/2009 | Bono et al. | |
| 7,747,584 B1 | 6/2010 | Jernigan, IV | |
| 7,788,233 B1 | 8/2010 | Iyer et al. | |
| 7,913,056 B2 | 3/2011 | Brown et al. | |
| 7,917,722 B2 | 3/2011 | Yamamoto et al. | |
| 7,925,683 B2 | 4/2011 | Jain et al. | |

(Continued)

FOREIGN PATENT DOCUMENTS

| | | |
|---|---|---|
| CN | 1692356 | 11/2005 |
| WO | WO-2006032049 | 3/2006 |
| WO | WO-2009054827 | 4/2009 |
| WO | WO-2009131585 | 10/2009 |

OTHER PUBLICATIONS

Lillibridge et al., U.S. Appl. No. 12/759,174 entitled "Capping a Number of Locations Referred to by Chunk References" filed Apr. 13, 2010 (41 pages).

(Continued)

*Primary Examiner* — Charles Rones
*Assistant Examiner* — Han Doan (57) ABSTRACT

For a restore request, at least a portion of a recipe that refers to chunks is read. Based on the recipe portion, a container having plural chunks is retrieved. From the recipe portion, it is identified which of the plural chunks of the container to save, where some of the chunks identified do not, at a time of the identifying, have to be presently communicated to a requester. The identified chunks are stored in a memory area from which chunks are read for the restore operation.

20 Claims, 6 Drawing Sheets

(56) References Cited

U.S. PATENT DOCUMENTS

| | | |
|---|---|---|
| 7,979,670 B2 | 7/2011 | Saliba et al. |
| 8,150,851 B2 | 4/2012 | Jones |
| 8,156,306 B1 | 4/2012 | Raizen et al. |
| 8,161,255 B2 | 4/2012 | Anglin et al. |
| 8,204,862 B1* | 6/2012 | Paulzagade et al. .......... 707/679 |
| 2001/0010070 A1 | 7/2001 | Crockett |
| 2003/0140051 A1 | 7/2003 | Fujiwara et al. |
| 2004/0162953 A1 | 8/2004 | Yoshida et al. |
| 2005/0108433 A1 | 5/2005 | Wu |
| 2005/0195635 A1* | 9/2005 | Conley et al. ................ 365/149 |
| 2006/0116990 A1 | 6/2006 | Margolus et al. |
| 2006/0282457 A1 | 12/2006 | Williams |
| 2007/0208788 A1 | 9/2007 | Chakravarty et al. |
| 2007/0239946 A1 | 10/2007 | Zhu |
| 2007/0255758 A1 | 11/2007 | Zheng et al. |
| 2008/0005141 A1 | 1/2008 | Zheng et al. |
| 2008/0034268 A1 | 2/2008 | Dodd et al. |
| 2008/0098083 A1 | 4/2008 | Shergill et al. |
| 2008/0133561 A1 | 6/2008 | Dubnicki |
| 2008/0244210 A1 | 10/2008 | Vingralek |
| 2008/0270461 A1 | 10/2008 | Gordon et al. |
| 2008/0294660 A1 | 11/2008 | Patterson et al. |
| 2008/0301256 A1 | 12/2008 | McWilliams et al. |
| 2009/0019246 A1 | 1/2009 | Murase |
| 2009/0037499 A1 | 2/2009 | Muthulingam |
| 2009/0077342 A1 | 3/2009 | Chen |
| 2009/0112946 A1 | 4/2009 | Jones |
| 2009/0204765 A1 | 8/2009 | Gupta |
| 2009/0254609 A1 | 10/2009 | Wideman |
| 2009/0313248 A1 | 12/2009 | Balachandran et al. |
| 2010/0037118 A1 | 2/2010 | Saliba et al. |
| 2010/0042790 A1 | 2/2010 | Mondal et al. |
| 2010/0070478 A1* | 3/2010 | Anglin .......................... 707/674 |
| 2010/0088296 A1 | 4/2010 | Periyagaram |
| 2010/0174881 A1 | 7/2010 | Anglin |
| 2010/0198792 A1 | 8/2010 | Camble |
| 2010/0205163 A1 | 8/2010 | Eshghi |
| 2010/0281230 A1 | 11/2010 | Rabii et al. |
| 2010/0299490 A1* | 11/2010 | Attarde et al. ................ 711/162 |
| 2010/0332454 A1* | 12/2010 | Prahlad et al. ................ 707/654 |
| 2011/0145207 A1 | 6/2011 | Agrawal et al. |
| 2011/0191522 A1* | 8/2011 | Condict et al. ................ 711/103 |
| 2011/0231362 A1 | 9/2011 | Attarde et al. |
| 2011/0252217 A1 | 10/2011 | Lillibridge |
| 2012/0036113 A1 | 2/2012 | Lillibridge |
| 2012/0159098 A1* | 6/2012 | Cheung et al. ................ 711/162 |
| 2012/0195362 A1* | 8/2012 | Benno et al. ............. 375/240.01 |

OTHER PUBLICATIONS

Lillibridge et al., U.S. Appl. No. 12/850,142 entitled "Performing Deduplication of Input Data at Plural Levels" filed Aug. 4, 2010 (39 pages).

Lillibridge et al., U.S. Appl. No. 12/777,478 entitled "Storing Chunks in Containers" filed May 11, 2010 (34 pages).

Brown et al., Block-level Inline Data Deduplication in ext3 dated Dec. 23, 2010 (8 pages).

Whitehouse, L., Data Protection Perspectives, www.dataprotectionperspectives.com dated Feb. 3, 2011 (3 pages).

August, David. Lecture, COS 217, Optimizing Malloc and Free, http://gee.cs.oswego.edu/dl/html/malloc.html, 8 pps.

IBM, www-07.ibm.com/sg/smarterbusiness/meettheexperts/manage_6.html, Information Protection Services dated Jan. 2010 (2 pages).

Jula et al., "How to Focus on Memory Allocation Strategies," Technical Report TR07-003, Jun. 18, 2007 (29 pages).

Litwin, Witold, Linear Hashing: A new tool for file and table addressing, I.N.R.I.A., published by IEEE 1980; pp. 212-223.

Mark Lillibridge et al., 2009, Sparse indexing: U large scale, in line deduplication using sampling and locality, pp. 111-1.

Muthitacharoen et al., "A Low-Bandwidth Network File System" (14 pages) (2001).

Peters, White Paper, The Benefits of Two-Stage Online Data Vaulting, Focus on the Digi-Data "SAFE" Offering, Nov. 2009 (12 pages).

Poelker, ComputerWorld Blogs, http://blogs.computerworld.com/poelker, Jan. 2010 (3 pages).

Quantum, White Paper, Data Deduplication Background: A Technical White Paper, Jan. 2009 (12 pages).

Rhea et al., Rev. 2008, Fast, inexpensive content-addressed storage in foundation, 2008, pp. 143-156.

Wendt, Symantec Corporation, A Candid Examination of Data Deduplication, Aug. 2009 (10 pages).

U.S. Appl. No. 12/777,478, Notice of Allowance dated Mar. 31, 2014 (7 pages).

U.S. Appl. No. 12/671,334, Notice of Allowance dated Mar. 3, 2014 (5 pages).

* cited by examiner

PROCESSING A REQUEST TO RESTORE DEDUPLICATED DATA

BACKGROUND

As capabilities of computer systems have increased, the amount of data that is generated and computationally managed in enterprises (companies, educational organizations, government agencies, and so forth) has rapidly increased. Data may be in the form of emails received by employees of the enterprises, where emails can often include relatively large attachments. Moreover, computer users routinely generate large numbers of files such as text documents, multimedia presentations, and other types of data objects that are to be stored and managed.

BRIEF DESCRIPTION OF THE DRAWINGS

Some embodiments are described with respect to the following figures.

DETAILED DESCRIPTION

In an enterprise, such as a company, an educational organization, a government agency, and so forth, the amount of data stored can be relatively large. To improve efficiency, deduplication of data can be performed to avoid or reduce repeated storage of common portions of data in a data store. In some implementations, deduplication of data can be accomplished by partitioning each data object into non-overlapping chunks, where a "chunk" refers to a piece of data partitioned from the data object. Examples of data objects include documents, image files, video files, audio files, backups, or any other collection or sequence of data. Upon receiving an input data object, the input data object is divided into chunks by applying a chunking technique. Note that if a data object is sufficiently small, the chunking technique may produce just one chunk from the input data object.

By dividing each data object into chunks, a chunk-based deduplication system is able to identify chunks that are shared by more than one data object or occur multiple times in the same data object, such that these shared chunks are stored just once in a data store (which is located in persistent storage media) to avoid or reduce the likelihood of storing duplicate data.

Generally, a chunk-based deduplication system divides input data into chunks, determines which chunks have already been stored, and stores new chunks (chunks that have not previously been stored in the data store) to the data store. In some implementations, chunks are stored in chunk containers in the data store, where a "container" is a logical data structure of a data store for storing one or multiple chunks. A container can be implemented as a discrete file or object.

In alternative implementations, instead of using discrete containers to store respective chunks, a contiguous storage area can be defined that is divided into a number of regions, where each region is able to store respective one or multiple chunks. Thus, a region of the contiguous storage area is also considered a "container."

In a specific example, if incoming data is divided into chunks A, B, C, A, D then only chunks A, D, C, and D would be stored in the data store, along with a recipe referring to the respective five input chunks. A recipe is a data structure that keeps track of where the chunks corresponding to a data set are stored in a data store. The recipe can store chunk references that point to locations of respective chunks in the data store. A chunk reference is a value that provides an indication of a location of a corresponding chunk. For example, the chunk reference can be in the form of a pointer (to a location), a hash value (that provides an indication of a location), an address, or some other location indication. A chunk reference can point to an individual chunk, or to a container.

Figure 1:
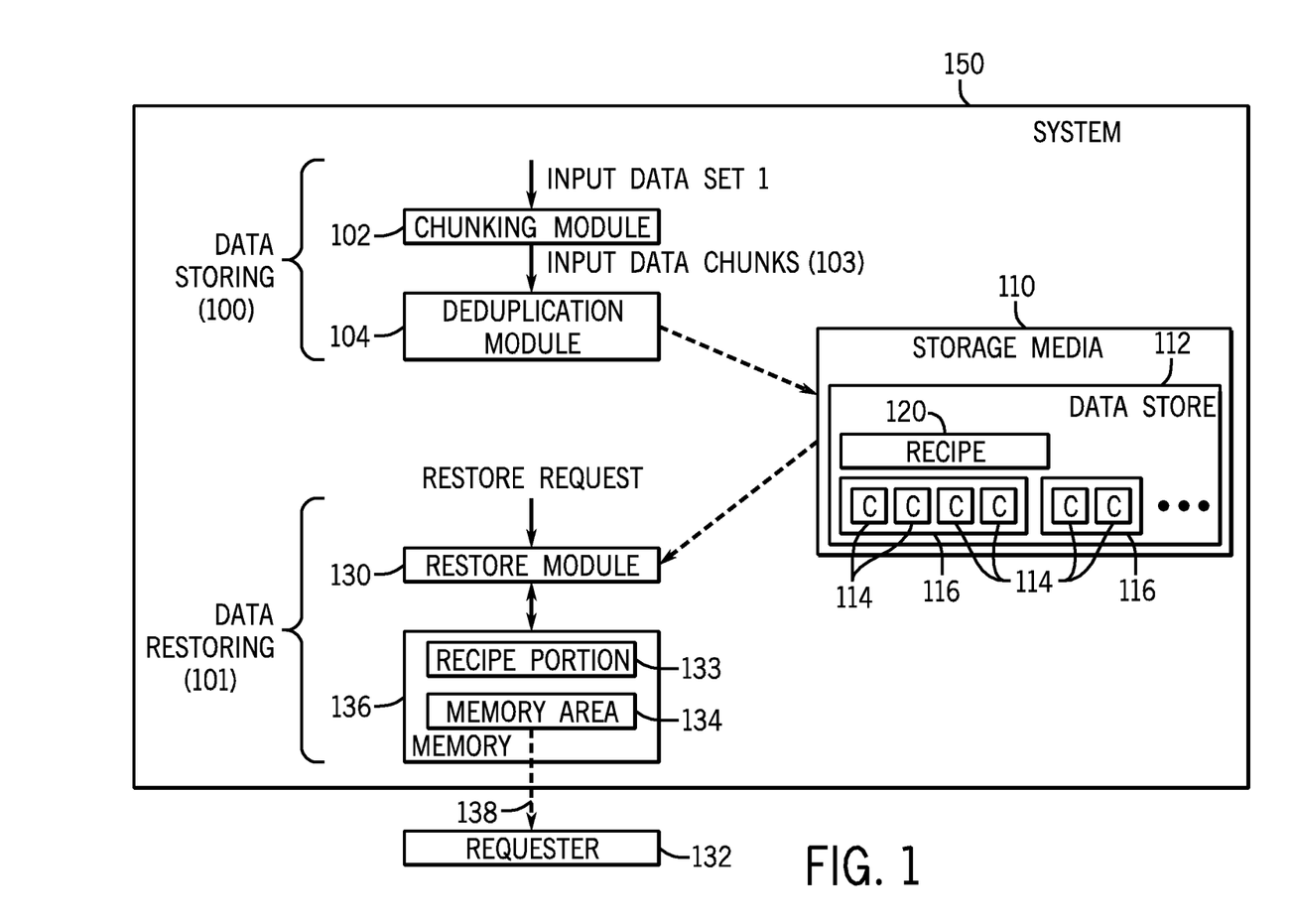
FIG. 1 is a schematic diagram of a system in which data storing and data restoring operations according to some implementations can be performed.

FIG. 1 is a schematic diagram of an example system 150 according to some implementations. The system 150 includes storage media 110 (also referred to as a "storage subsystem"), which can be implemented with one storage device or a collection of storage devices (e.g. disk-based storage devices and/or integrated circuit storage devices). The storage media 110 can be persistent storage media. A data store 112 is stored in the storage media 110.

The system 150 also includes a memory 136, which can be implemented with a higher-speed storage device than the storage device(s) of the storage media 110

As part of a data storing operation (100) to store data in the data store 112, input data (labeled "input data set 1") is provided into a chunking module 102. The chunking module 102 produces input data chunks (103) from input data set 1, based on application of a chunking technique. Examples of chunking techniques are described in Athicha Muthitacharoen et al., "A Low-Bandwidth Network File System," Proceedings of the 18th (ACM) Symposium on Operating Systems Principles, pp. 174-187 (2001), and in U.S. Pat. No. 7,269,689.

In alternative implementations, the chunking module 102 can be located in a system separate from system 150 to perform the chunking of input data at the separate system.

The input data chunks 103 are provided by the chunking module 102 to a deduplication module 104, which applies deduplication of the input data chunks to eliminate or reduce the likelihood of storing duplicate chunks. After deduplication, the chunks corresponding to input data set 1 are stored (as chunks 114) as deduplicated data in the data store 112. As depicted in FIG. 1, the data store 112 has multiple containers 116 in which the chunks 114 are stored. The deduplication module 104 generates a recipe 120, which keeps track of where the chunks corresponding to input data set 1 are located in the data store 112. The recipe 120 can also be stored in the data store 112.

The data storing operation (100) is repeated for each input data set to be stored in the data store 112.

FIG. 1 further depicts a data restoring operation (101). Reference is also made to the flow diagram of FIG. 2 in the ensuing discussion. A restore module 130 receives (at 202) a restore request (which can be submitted by a requester 132). The restore request is a request to restore data stored in the data store 112. In some examples, the requester 132 can be a remote client computer that can submit the restore request over a data network to the system of FIG. 1. Alternatively, the requester 132 can be an application or some other entity in the system shown in FIG. 1.

Figure 2:
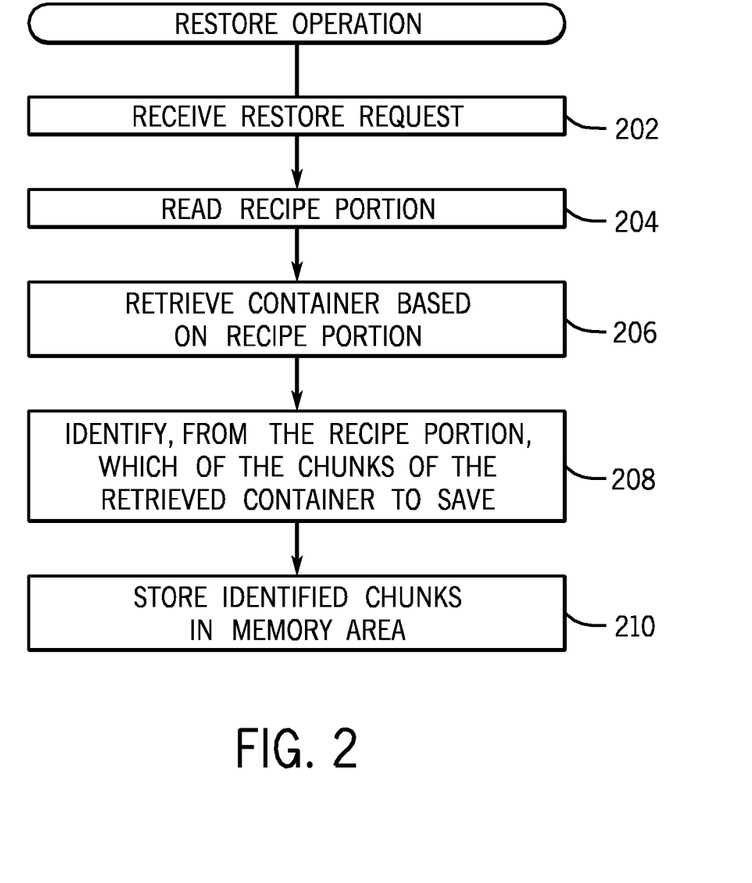
FIG. 2 is a flow diagram of a restore operation according to some implementations.

In response to the request, the restore module 130 reads (at 204) at least a portion of a recipe 120. The recipe portion (133) is read into the memory 136. If the overall size of the recipe 120 is larger than a storage space in the memory 136, then the recipe portion 133 retrieved from the storage media 110 into the memory 136 is less than the entirety of the recipe 120. On the other hand, if the overall size of the recipe 120 is less than the recipe portion storage space of the memory 136, then the retrieved recipe portion 133 would be the entire recipe 120.

The restore module 130 uses the recipe portion 133 to determine what containers to retrieve from the data store 112, such that chunks from the retrieved containers 116 can be obtained for the restore operation. The order of the containers retrieved from the data store 112 is based in part on the sequence of chunks in the recipe portion 133. Thus, based on the recipe portion, the restore module 130 retrieves (at 206) a container. The retrieved container can be stored in a buffer, which can be part of the memory 136 or part of another storage structure.

In some implementations, retrieving the container may involve fetching from the data store 110 only a subset of its chunks. For example, if chunk containers are files containing their chunks one after another, retrieving the container may involve reading from the start of the earliest (in terms of file offset) chunk in the container that will be saved (see next step) to the end of the latest chunk in the container that will be saved. This avoids reading data that will not be used. If there are large runs of chunks that will not have to be saved in the middle of the container, then it may make sense to do two or more smaller reads that cover the chunks that will have to be saved.

Next, the restore module 130 identifies (at 208), from the recipe portion, which of the multiple chunks of the retrieved container to save. Some of the chunks that are identified for saving do not, at a time of the identifying (208), have to be presently communicated to the requester 132 for the restore operation specified by the restore request. By identifying chunks that do not, at the time of the identifying, have to be presently communicated to the requester 132 for the requested restore operation, the restore module 130 effectively performs look-ahead retrieval of selected chunks, where this look-ahead retrieval (prefetching) is based on content of the recipe portion 133. Note that the ability to prefetch allows chunks that may have to be used in the restore operation at a later time to be prefetched from the container that is currently retrieved. This improves efficiency since the same container does not have to be retrieved again at a later point in the recipe portion 133 to obtain chunks that have been prefetched.

The identified chunks are stored (at 210) in a memory area 134 in the memory 136. The memory area 134 may be a predefined region of the memory 136, of a predefined size, that is used to temporarily store chunks that are to be used in the restore operation requested by the restore request. In storing the identified chunks into the memory area 134, the restore module 130 determines locations in the memory area 134 to place the identified chunks. In some implementations, the determined locations are based on an order of chunks referred to in the recipe portion. Moreover, adjacent chunks in the recipe portion have adjacent locations in the memory area 134.

Chunks are read from the memory area 134 as the restore operation proceeds, with the chunks written out to the requester 132 (as indicated by dashed arrow 138 in FIG. 1).

Figure 3:
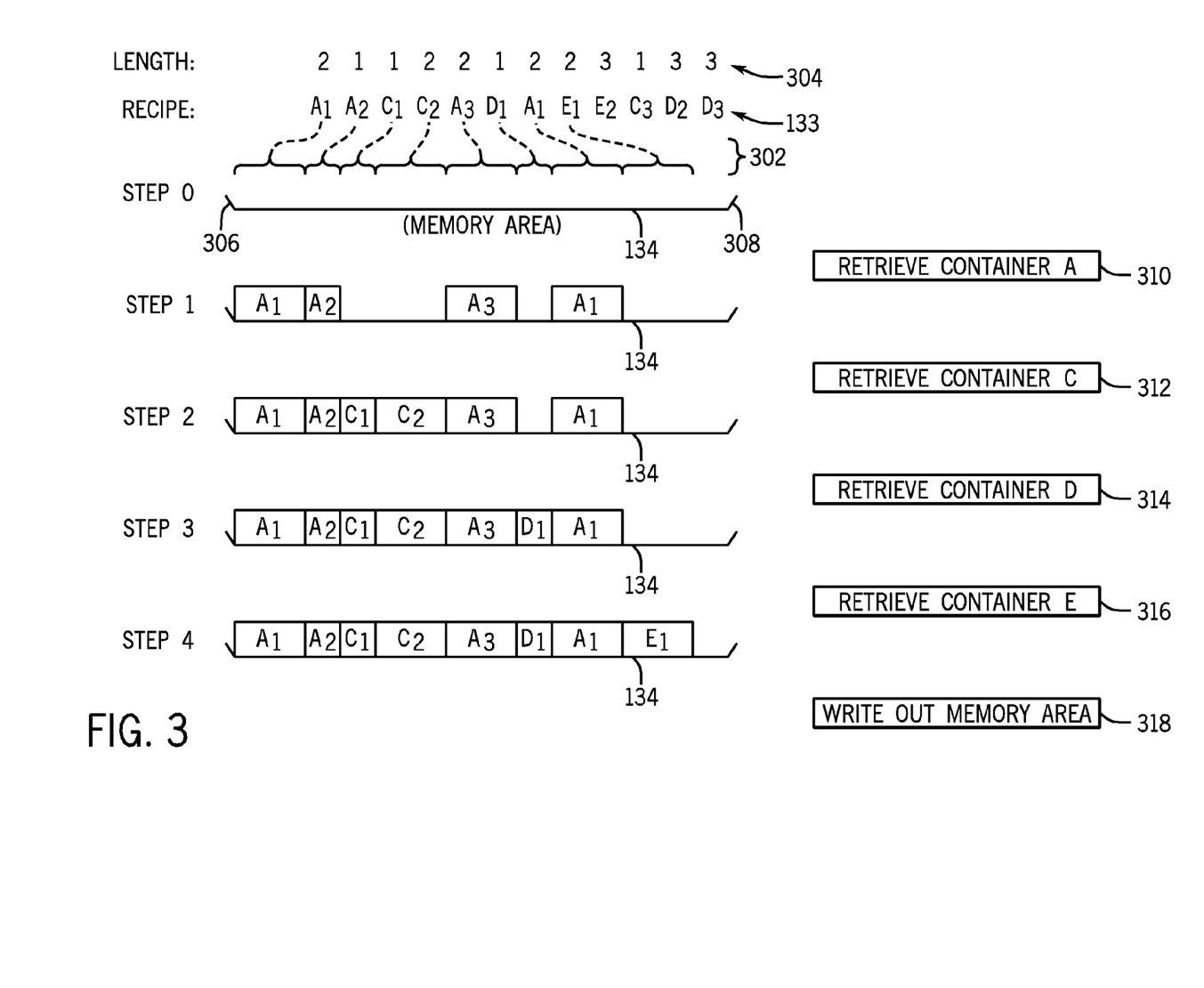
FIGS. 3-5 illustrate retrieval of chunks into a memory area for performing a restore operation, according to various implementations.

An example according to some implementations of populating the memory area 134 using an example recipe portion 133 is shown in FIG. 3. In the example of FIG. 3, the recipe portion 133 contains chunk references to the following chunks (in this order): $A_1, A_2, C_1, C_2, A_3, D_1, A_1, E_1, E_2, C_3, D_2$, and $D_3$. In the foregoing example, each of the "A," "C," "D," and "E" designations is a designation of a respective container (container A, container C, container D, container E). The numeral following each container designation (such as "1" following "A" in $A_1$) indicates a respective chunk in the container (e.g. $A_1, A_2$, and $A_3$ are references to the first three chunks in container A). Note that some chunks (e.g., $A_1$) are referenced multiple times in the recipe portion 133, reflecting underlying duplication in the stored data object.

Note that the chunks can have varying lengths. The chunk lengths are indicated with chunk length indicators 304. Each chunk length indicator expresses a unit of length (e.g. a byte, a predefined number of bytes, etc.). Thus, in this example, $A_1$ is twice as long as $A_2$. To keep the example simple, unrealistically small integers are used for the lengths.

FIG. 3 also shows a mapping (302) between the chunk references of the recipe portion 133 and respective locations of the memory area 134. In the example, the first reference to chunk $A_1$ is mapped to the first portion (having length 2) of the memory area 134, the reference to chunk $A_2$ is mapped to the next adjacent portion (having length 1) of the memory area 134, and so forth. Effectively, the mapping 302 assigns locations and space in the memory area 134 to the chunks referred to in the recipe portion 133.

In FIG. 3, the beginning point of the memory area 134 is represented as 306, while the endpoint of the memory area 134 is represented as 308. At step 0, it is assumed that the memory area 134 is initially empty. Upon receiving a restore request, the restore module 130 retrieves the recipe portion 133 into the memory 136 (as shown in FIG. 1, for example). Based on the retrieved recipe portion 133, the restore module 130 creates a mapping 302 between the retrieved recipe portion 133's chunk references and locations in the memory area 132. The mapping may be created by sequentially assigning space in the memory area to chunk references in the recipe portion 133 based on the referenced chunks' length until the process runs out of recipe portion 133 or memory area 134.

The restore module 130 next chooses a container to retrieve. While there is a chunk spot in the memory area 134 that has no data yet, the corresponding chunk reference in the recipe portion 133 is identified, and the corresponding container is retrieved into the memory 136. When there is more than one such chunk spot, the implementation chooses one. A "chunk spot" in the memory area 134 refers to a spot in the memory area 134 that has been assigned to store a chunk by recipe portion mapping 302.

In some implementations, the earliest such spot is always chosen. In the example of FIG. 3, the first container retrieved (at 310) by such implementations is the container of chunk $A_1$, that is container A.

At step 1, after retrieving container A, the restore module 130 identifies the chunks of container A that are to be saved into the memory area 134. Based on the recipe portion mapping 302, such chunks include chunks $A_1, A_2$, and $A_3$, at the respective locations indicated by the recipe portion mapping. Note that the chunk $A_1$ is stored twice in the memory area 134, since the recipe portion 133 refers to $A_1$ twice.

After the identified chunks from container A have been saved into the memory area 134, the restore module 130 retrieves (at 312) the next container, which for the discussed implementations is container C because the first empty chunk spot remaining is that for $C_1$. Based on the recipe portion mapping 302, the restore module 130 identifies chunks $C_1$ and $C_2$ as the chunks that are to be saved into the memory area 134. Note that the memory area 134 does not have sufficient space to store another chunk from container C, namely chunk $C_3$, that is referred to by the recipe portion 133 but not included in recipe portion mapping 302. As a result, even though the recipe portion 133 refers to chunk $C_3$, this chunk is not saved into the memory area 134 since the memory area 134 does not have sufficient space. Thus, the only chunks saved from container C are chunks $C_1$ and $C_2$.

Next, container D is retrieved (at 314), and chunk $D_1$ is stored into the memory area 134—however, chunks $D_2$ and $D_3$ that are referred to by the recipe portion 133 are not stored into the memory area 134, since there is insufficient space in the memory area 134.

Container E is next retrieved (at 316), and chunk $E_1$ is saved to the memory area 134 (step 4). However, chunk $E_2$ is not saved into the memory area 134, since there is insufficient space.

In some implementations, once the memory area 134 has been filled up to the extent possible using the recipe portion 133, the chunks in the memory area 134 are written out to the requester 132. Because the chunks are placed in the memory area 134 in the order to be used by the requester (e.g., that of the recipe portion 133) and because there is no space between the chunks, they may be written out to the requester in a single sequential write operation.

The memory area 134 is thus filled up a chunk at a time from successively retrieved containers. Once the memory area 134 is filled up, the chunks in the memory area 134 are written out to the requester 132. While there is a chunk spot in the memory area 134 that has no data yet, the corresponding chunk reference in the recipe portion 133 is identified, and the corresponding container is retrieved in its entirety into the memory 136. For each chunk in the loaded chunk container, the chunk data is copied to the chunk spots in the memory area 134 (if any) that are associated with that chunk by the recipe portion mapping 302.

Afterwards, the part of the recipe portion 133 that was mapped to the memory area 134 is discarded from memory and more of recipe 120 (if any remains) is read into the recipe portion storage area, forming a new recipe portion. For the example of FIG. 3, the new recipe portion might start out with $E_2, C_3, D_2, D_3, B_1, C_4, F_1$. The process is then repeated with the memory area 134 being emptied, a new recipe portion mapping being generated, and then containers retrieved/chunks saved and the resulting chunks being written out to the requester. This process continues to be repeated until the entire recipe 120 has been processed.

In alternative implementations, the memory area 134 can be implemented as a ring buffer. With the ring buffer implementation, as data is saved to the beginning portion of the memory area 134, such data can be written out as soon as the data becomes available in the memory area 134. As used here, "beginning portion" of the memory area 134 that can be written out refers to a contiguous portion of chunks in the memory area 134, starting at the beginning point 306. Here the rightmost byte and the leftmost byte of memory area 134 are considered continuous because the memory area 134 is regarded as a ring. Once the beginning portion is written out, the beginning point 306 of the memory area 134 can be advanced (shifted) by an amount equal to the amount of chunks in the beginning portion that was written out.

Figure 4:
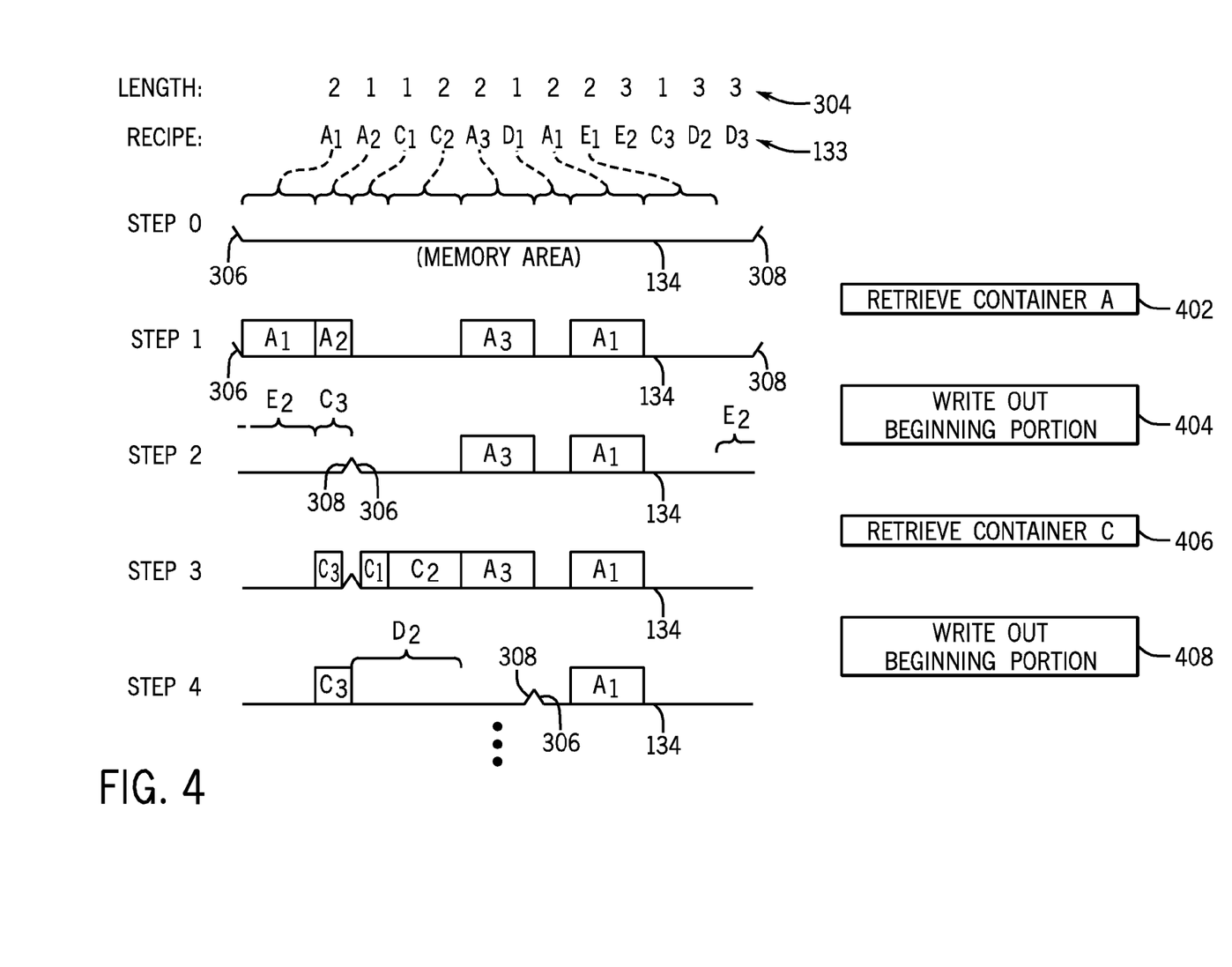

FIG. 4 shows an example of a ring buffer implementation. Steps 0 and 1 of FIG. 4 are the same as corresponding steps 0 and 1 of FIG. 3. Chunk container A is retrieved (at 402), and identified chunks from container A are saved to the memory area 134 at respective locations pointed to by the recipe portion mapping 302 (step 1). However, with implementations according to FIG. 4, as soon as chunks $A_1$ and $A_2$ (which make up a beginning portion adjacent to the beginning point 306) are saved to the memory area 134, these chunks are written out (at 404), and the beginning point 306 of the memory area 134 is advanced (shifted) by the size of the beginning portion that was written out (including chunks $A_1$ and $A_2$). The advancing of the beginning point 306 (along with the endpoint 308) of the memory area 134 is depicted in step 2 in FIG. 4.

At this point, the recipe portion mapping 302 may be extended to take advantage of the additional space now available in the memory area 134, allowing memory spots to be assigned to $E_2$ and $C_3$. Note that the memory spot for $E_2$ wraps around, starting from the far right and continuing to the far left. The part of the recipe portion 133 referring to the chunks that have been written out may be discarded at this time; in addition, more of the recipe 120 may be retrieved and appended to the recipe portion 133. This may help ensure that as much of the memory area 134 as possible can be used for chunk spots.

After step 2, the next container (C) is retrieved (at 406), and chunks $C_1$ and $C_2$ are written to locations adjacent the beginning point 306. Once $C_1$ and $C_2$ are written to the beginning portion of the memory area 134, these chunks ($C_1$ and $C_2$) as well as the next adjacent chunk ($A_3$) can be written out (at 408) ($C_1$ and $C_2$ together with $A_3$ at step 3 of FIG. 4 make up the beginning portion that can be written out). The beginning point 306 of the memory area 134 is then advanced by the length of the chunks $C_1$, $C_2$, and $A_3$ (step 4).

This process continues with further containers. By writing out beginning portions (containing contiguous chunks) of the memory area 134 frequently, spots can be allocated for chunks sooner, which can avoid extra container retrievals. For example, note that in FIG. 4 the process is able to allocate a spot for $C_3$ before the process retrieves container C, whereas the process was unable to do so according to implementations depicted in FIG. 3. This forces the process to retrieve container C twice in the non-ring buffer implementations (once to retrieve $C_1$ and $C_2$ and once to retrieve $C_3$) whereas the process only has to retrieve container C once in the ring buffer implementation.

In further implementations where the memory area 134 is implemented as a ring buffer, rather than temporarily save all chunks to be used by the requester from a container into the memory area 134, certain chunks or at least some of their copies can bypass the memory area 134 altogether and can be directly written out by the restore module 130 to the requester 132 (without passing through the memory area 134). Chunk copies that can bypass the memory area 134 are those that would have been written as part of a contiguous sequence of one or multiple chunks from the front portion of the memory area 134 adjacent the beginning point 306. Such chunk copies may be the first continuous run of chunks from a container in the recipe portion.

Figure 5:
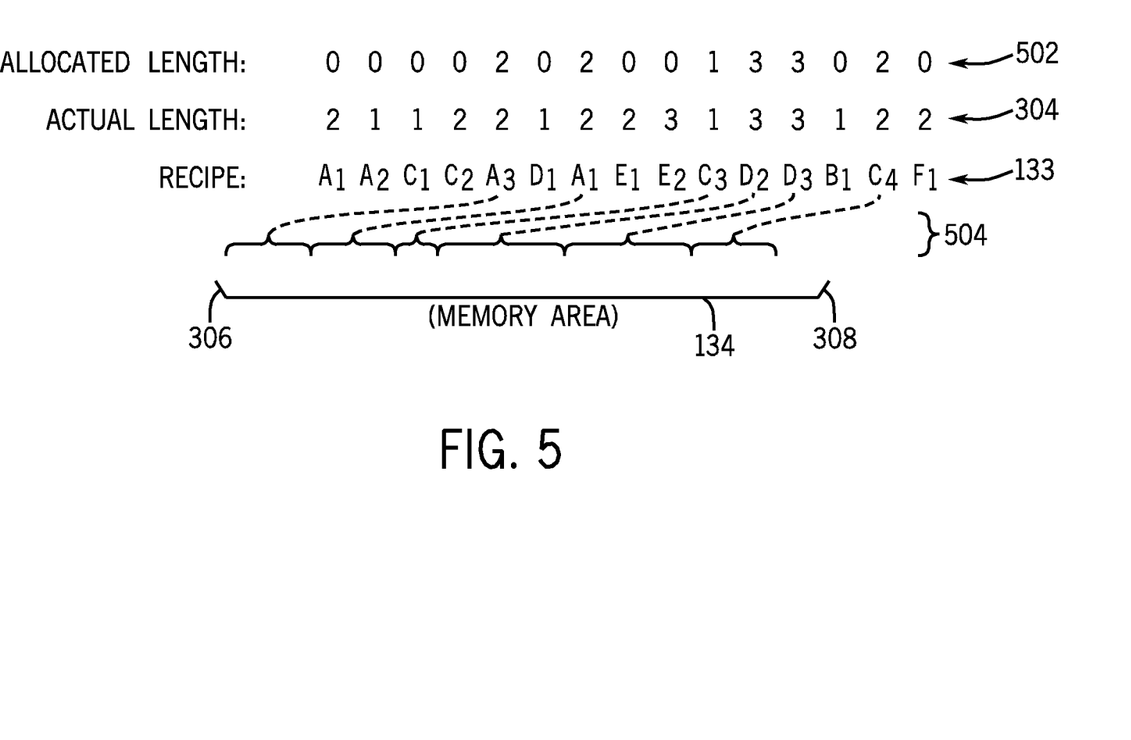

Chunk copies (equivalently their associated chunk references) that can bypass the memory area are allocated zero length, since they do not use up any space in the memory area 134. FIG. 5 illustrates an example in which chunk copies of the recipe portion 133 that would have been written to the front portion of the memory area 134 are allocated zero length, as indicated at 502. These chunk copies (which are associated with zero length) are written by the restore module 130 to the requester 132, without temporarily buffering in the memory area 134. Such optimization can allow for the memory area 134 to cover a larger number of chunks than otherwise possible because spots are not allocated for chunk copies that are to be written to the front portion of the memory area 134.

Note that the first reference to chunk $A_1$ is allocated zero length but the second reference to chunk $A_1$ is not. This is because the first copy of $A_1$ is immediately written out when container A is retrieved (see step 2 of FIG. 4) but the second copy of $A_1$ is only written out later after another container is retrieved (after step 4 of FIG. 4).

As shown in FIG. 5, the recipe portion mapping 504 between the recipe portion 133 and the memory area 134 indicates that only those chunk copies allocated non-zero lengths are associated with respective locations in the memory area 134. The chunk copies allocated zero length are not associated with locations in the memory area 134. Alternatively, chunk copies allocated zero length may be associated with the location where they would normally have appeared. For example chunk $D_1$ may be associated with the location between chunks $A_3$ and $A_1$.

Further variations can involve loading just part(s) of the container that is (are) known to contain chunks to be saved. For example, an index (defined on the data store 112) can indicate where chunks are in each container.

In some implementations, the chunks in the chunk containers may be compressed or otherwise not in the format used by the requester. In such cases, the chunk containers can be uncompressed/converted after being retrieved or the compression/conversion can be done as the chunks are saved to the memory area. The latter may allow avoiding uncompressing or converting some of the chunks that do not have to be saved. In other implementations, compressed/unconverted chunks may be saved to the memory area and only uncompressed/converted just before sending to the requester. In this case, the length of the compressed/unconverted chunk should be used when allocating spots in the memory area.

Figure 6:
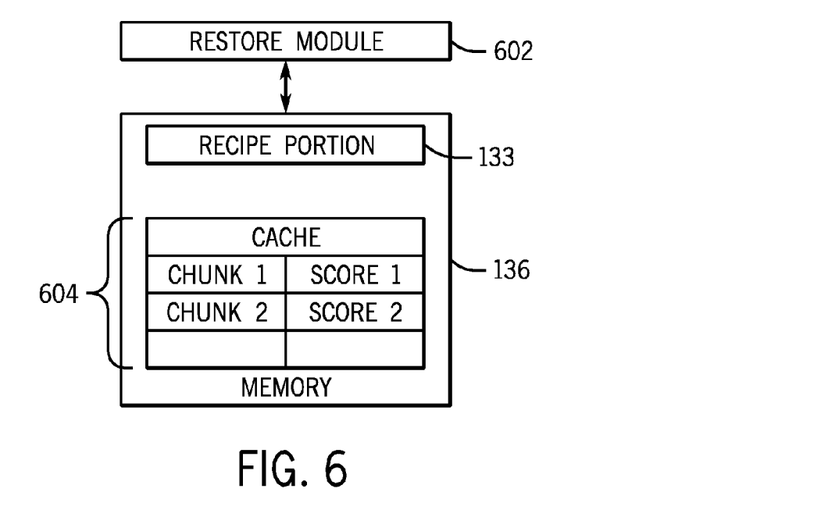
FIG. 6 illustrates a cache memory subsystem for storing chunks, according to alternative implementations.

In alternative implementations, the memory area 134 shown in FIG. 1 can be arranged as a cache for caching chunks. FIG. 6 shows an example in which the memory 136 is configured with a chunk cache 604 that is to be used for caching chunks for a restore operation. A restore module 602 shown in FIG. 6 is similar to the restore module 130 of FIG. 1, except that the restore module 602 of FIG. 6 is configured to perform cache management of the cache 604.

The restore module 602 starts with an empty cache. When the restore module 602 attempts to obtain the first chunk of the recipe portion 133 in order to send it to the requester, the cache will miss. In response to a cache miss, the restore module 602 retrieves the container containing the missing chunk. Based on the recipe portion 133, the restore module 602 decides which chunks of the retrieved container to store in the cache and which chunks already in the cache to evict to make space for the new chunks.

This decision may be based on a "score" associated with each of the chunks. As shown in FIG. 6, a score can be associated with each chunk in the cache 604. Thus, as shown, chunk 1 is associated with score 1, chunk 2 is associated with score 2, and so forth. The restore module 602 may decide to perform a process in which the chunks with the lowest scores of the combined set of chunks composed of the chunks already in the cache and in the newly retrieved container end up/stay in the cache. Thus, for example if the cache is full, chunk A has the highest score in the cache, chunk B has the lowest score in the retrieved container, and A has a higher score than B, then chunk A may be evicted from the cache and chunk B may be saved to the cache.

Each score may be based on the earliest point in time in the data stream being requested (as specified by the recipe portion 133) that the respective chunk is known to recur (after the part that has already been written to the requester). This score may be assigned infinity if the respective chunk does not recur in the recipe portion 133. In some examples, a higher score indicates that the respective chunk recurs later in the data stream specified by the recipe portion 133 than another chunk associated with a lower score. An infinite score indicates that the respective chunk will not recur in the recipe portion 133.

Consider again the example recipe portion 133 from FIG. 3: $A_1$, $A_2$, $C_1$, $C_2$, $A_3$, $D_1$, $A_1$, $E_1$, $E_2$, $C_3$, $D_2$, and $D_3$. Before any chunks are written out, the chunks from container A might have the following scores: $A_1=0$, $A_2=1$. $A_3=4$, $A_4=$infinity. After chunk $A_1$ is written out, its score would change to 6. After chunk $A_2$ is written out, its score would change to infinity.

If it is assumed (unrealistically) that cache 604 can hold only three chunks, then restore module 602 will choose to save chunks $A_1$, $A_2$, and $A_3$ from container A. It may choose not to save chunks with infinite scores even if there is room in the cache. Note that the restore module 602 chose to save chunk $A_3$ even though it does not have to be presently communicated to the requester. The restore module 602 will then send chunks $A_1$ and $A_2$ out to the requester: $A_2$ hits in the cache. It will then miss when asking for $C_1$ and retrieve container C. At this point, it will evict chunks $A_1$ and $A_2$ and save chunks $C_1$, and $C_2$. Note that $A_3$ is kept in the cache in preference to saving $C_3$ because it has a higher score.

As an additional portion of the recipe is retrieved into the memory 136 and as chunks are written out to the requester, the scores associated with the chunks in the cache 604 are updated (based in part on when respective chunks will recur according to the additional recipe portion).

Many variants can also be possible. For example, higher score values could be preferred to lower score values. For another, instead of using the chunk offset within the stream as shown here, the byte offset within the stream could be used.

Figure 7:
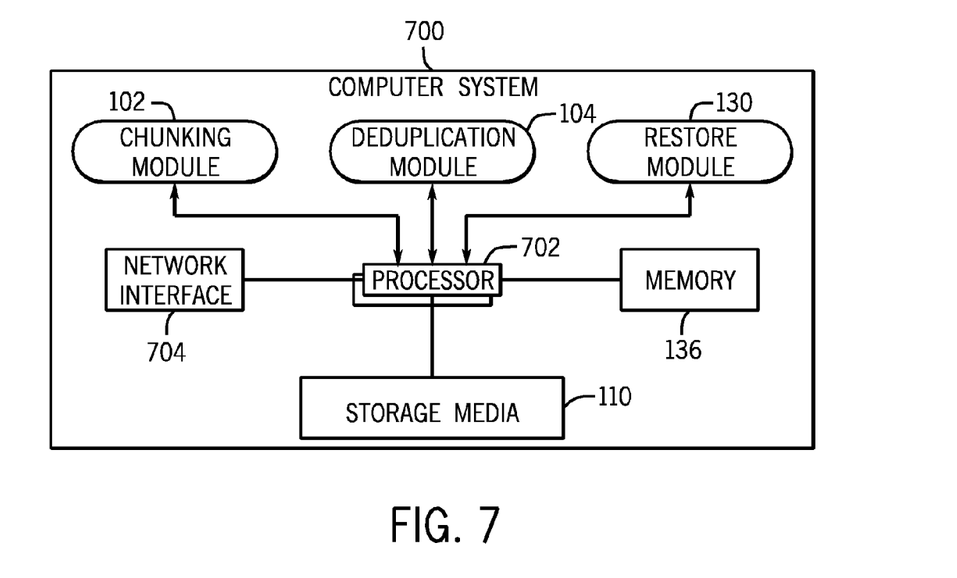
FIG. 7 is a block diagram of an example computer system incorporating some implementations.

FIG. 7 is a block diagram of an example computer system 700 in which some embodiments can be incorporated. The computer system 700 can be a single-node computer system, or a multi-node, distributed computer system. The computer system 700 can be a backup system or archival system to store backup data. Alternatively, the computer system 700 can be other types of systems, such as desktop computers, notebook computers, personal digital assistants, server computers, and so forth.

The computer system 700 includes the chunking module 102, deduplication module 104, and restore module 130 or 602. These modules can include machine-readable instructions executable on one or multiple processors 702. A processor can include a microprocessor, microcontroller, processor module or subsystem, programmable integrated circuit, programmable gate array, or another control or computing device. In alternative implementations, the chunking module 102 and/or deduplication module 104 can be located on a separate system.

The one or multiple processors 708 are connected to the memory 136 and storage media 110. The one or multiple processors 708 are also connected to a network interface 704 to allow the computer system 700 to communicate over a data network.

The storage devices making up the storage media 110 and memory 136 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, from a requester, a request to restore data stored in a storage subsystem, wherein the data stored in the storage subsystem includes deduplicated data;
   in response to the request,
      reading at least a portion of a recipe that refers to chunks in the deduplicated data;
      based on the recipe portion, retrieving a first container having plural chunks;
      identifying, from the recipe portion, which of the plural chunks of the first container to save, wherein some of the identified chunks do not, at a time of the identifying, have to be presently communicated to the requester for a restore operation specified by the request;
      determining locations in a memory area to place the identified chunks, wherein the determined locations are based on an order of chunks referred to in the recipe portion;
      storing the identified chunks in the determined locations of the memory area from which chunks are read as the restore operation proceeds, wherein storing the identified chunks in the determined locations results in at least one empty chunk spot between at least two of the identified chunks;
      retrieving, based on the recipe portion, a second container having plural chunks; identifying, from the recipe portion, which of the plural chunks of the second container to save to the memory area; and
      storing the identified chunks of the second container in the memory area, at least one of the identified chunks of the second container stored in the empty chunk spot.

2. The method of claim 1, wherein the memory area has a predefined size.

3. The method of claim 1, wherein adjacent chunks in the recipe portion have adjacent locations in the memory area.

4. The method of claim 1, wherein the memory area includes a ring buffer, the method further comprising:
   shifting a beginning point of the ring buffer as chunks are read out of the ring buffer in the restore operation.

5. The method of claim 1, further comprising:
   assigning locations and space in the memory area to chunk references of the recipe portion, wherein some of the chunk references are allocated zero space.

6. The method of claim 1, wherein storing the identified chunks in the memory area comprises storing the identified chunks in a cache, the method further comprising:
   using the recipe portion to determine which chunk in the cache to evict to provide space for storing another chunk.

7. The method of claim 6, wherein determining which chunk in the cache to evict is based in part on an order in which each chunk will have to be communicated to the requester by the restore operation.

8. A system comprising:
   non-transitory storage media to store a data store including containers containing respective chunks that are part of deduplicated data; and
   at least one processor to:
      in response to a restore request, received from a requester, specifying a restore operation, read a portion of a recipe that refers to chunks in the data store;
      retrieve, based on the recipe portion, a first one of the containers that has plural chunks;
      identify, from the recipe portion, which of the plural chunks of the first container to save, wherein some of the identified chunks do not, at a time of the identifying, have to be presently communicated to the requester for the restore operation specified by the restore request;
      determine locations in a memory area to place the identified chunks, wherein the determined locations are based on an order of chunks referred to in the recipe portion;
      store the identified chunks in the determined locations of the memory area from which chunks are read for the restore operation, wherein storing the identified chunks in the determined locations results in at least one empty chunk spot between at least two of the identified chunks;
      retrieve, based on the recipe portion, a second of the containers having plural chunks;
      identify, from the recipe portion, which of the plural chunks of the second container to save to the memory area; and
      store the identified chunks of the second container in the memory area, at least one of the identified chunks of the second container stored in the empty chunk spot.

9. The system of claim 8, wherein chunk references of the recipe portion are to be allocated locations and space in the memory area according to an order of the chunk references.

10. The system of claim 9, wherein the identified chunks are to be stored at locations in the memory area corresponding to locations allocated for the identified chunks.

11. The system of claim 8, wherein the memory area is a ring buffer having a beginning point, wherein the at least one processor is to write out a beginning portion of contiguous one or multiple chunks adjacent to the beginning point upon the contiguous one or multiple chunks being saved in the memory area.

12. The system of claim 11, wherein the at least one processor is to shift the beginning point of the ring buffer in response to the beginning portion being written out.

13. The system of claim 11, wherein locations and space in the memory area are to be assigned to chunk references of the recipe portion, and wherein some of the chunk references of the recipe portion are allocated zero space.

14. The system of claim 13, wherein the some of the chunks referenced by chunk references allocated zero space are to be written out to the requester without first saving them to the memory area.

15. The system of claim 8, wherein the memory area comprises a cache, and wherein the at least one processor is to evict chunks from the cache based on content of the recipe portion.

16. The system of claim 15, wherein the identified chunks will be used by the requester according to the recipe portion before the evicted chunks.

17. An article comprising at least one non-transitory machine-readable storage medium storing instructions that upon execution cause a system to:
   receive, from a requester, a request to restore data stored in a storage subsystem, wherein the data stored in the storage subsystem includes deduplicated data;
   in response to the request,
      read at least a portion of a recipe that refers to chunks in the deduplicated data, wherein the chunks referred to in the recipe portion are chunks from multiple containers;
      based on the recipe portion, select a first one of the multiple containers to retrieve;
      retrieve the first container having plural chunks;
      identify, from the recipe portion, which of the plural chunks of the first container to save, wherein some of the identified chunks do not, at a time of the identifying, have to be presently communicated to the requester for a restore operation specified by the request;
      determine locations in a memory area to place the identified chunks, wherein the determined locations are based on an order of chunks referred to in the recipe portion;
      store the identified chunks in the memory area from which chunks are read as the restore operation proceeds, wherein storing the identified chunks in the determined locations results in at least one empty chunk spot between at least two of the identified chunks;
      after storing the identified chunks in the memory area, select a second one of the multiple containers based on the recipe portion; and
      reiterating the retrieving, the identifying, and the storing for the second container, wherein the storing for the second container comprises storing a data chunk of the second container in the empty chunk spot of the memory area.

18. The article of claim 17,
   wherein an order of retrieving containers for processing a response to the request is based on a sequence of the chunks referred to in the recipe portion.

19. The method of claim 1, wherein the chunks referred to in the recipe portion are chunks from multiple containers, and wherein the retrieved first container is one of the multiple containers selected for retrieval based on the recipe portion.

20. The system of claim 8, wherein the chunks referred to in the recipe portion are chunks from multiple containers of the containers included in the data store, and wherein the at least one processor is to select the first container from among the multiple containers for retrieval, based on the recipe portion.

* * * * *